(12) United States Patent
Dietz

(10) Patent No.: US 10,511,889 B2
(45) Date of Patent: Dec. 17, 2019

(54) SYSTEMS AND METHODS FOR AUTOMATICALLY RETURNING TO PLAYBACK OF A MEDIA ASSET WHEN THE MEDIA ASSET IS TRENDING IN SOCIAL CHATTER

(71) Applicant: Rovi Guides, Inc., San Jose, CA (US)

(72) Inventor: Todd Dietz, North Wales, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/825,891

(22) Filed: Nov. 29, 2017

(65) Prior Publication Data
US 2019/0166405 A1    May 30, 2019

(51) Int. Cl.
| | |
|---|---|
| *H04N 21/24* | (2011.01) |
| *H04N 21/214* | (2011.01) |
| *H04N 21/432* | (2011.01) |
| *H04N 21/45* | (2011.01) |
| *H04N 21/472* | (2011.01) |
| *H04N 21/4788* | (2011.01) |
| *H04N 21/845* | (2011.01) |
| *G06F 16/73* | (2019.01) |
| *H04N 7/088* | (2006.01) |
| *H04N 5/44* | (2011.01) |
| *G06F 16/738* | (2019.01) |

(52) U.S. Cl.
CPC ....... *H04N 21/47214* (2013.01); *G06F 16/73* (2019.01); *H04N 21/2143* (2013.01); *H04N 21/4532* (2013.01); *G06F 16/738* (2019.01); *H04N 7/0884* (2013.01); *H04N 2005/4433* (2013.01)

(58) Field of Classification Search
CPC .......... H04N 21/4532; H04N 21/4383; H04N 21/482; H04N 21/4316; H04N 21/8126; H04N 21/4622
See application file for complete search history.

(56) References Cited

U.S. PATENT DOCUMENTS

| | | |
|---|---|---|
| 6,239,794 B1 | 5/2001 | Yuen |
| 6,564,378 B1 | 5/2003 | Satterfield |
| 7,165,098 B1 | 1/2007 | Boyer |
| (Continued) | | |

OTHER PUBLICATIONS

PCT International Search Report for International Application No. PCT/US2018/038769, dated Oct. 2, 2018 (14 pages).

*Primary Examiner* — Hsiungfei Peng
*Assistant Examiner* — Fred Peng
(74) *Attorney, Agent, or Firm* — Haley Guiliano LLP

(57) ABSTRACT

Systems and methods are disclosed herein for returning to a first media asset that was replaced by playback of a second media asset when the first media asset is trending in social chatter. A media guidance application may identify the first media asset. In response to receiving a command from a user input device to access a second media asset, the media guidance application may replace playback of the first media asset with playback of the second media asset and monitor a social network for chatter relating to the first media asset. In response to detecting a threshold amount of chatter on the social network relating to the first media asset, the media guidance application may identify a play position in the first media asset corresponding to the chatter, and replace playback of the second media asset with playback of the first media asset at the identified play position.

18 Claims, 8 Drawing Sheets

(56) References Cited

U.S. PATENT DOCUMENTS

| | | |
|---|---|---|
| 7,761,892 B2 | 7/2010 | Ellis |
| 7,949,722 B1 * | 5/2011 | Ullman ................. G06Q 30/02 |
| | | 709/217 |
| 8,046,801 B2 | 10/2011 | Ellis |
| 2002/0174430 A1 | 11/2002 | Ellis |
| 2005/0251827 A1 | 11/2005 | Ellis |
| 2010/0153885 A1 | 6/2010 | Yates |
| 2011/0283304 A1 * | 11/2011 | Roberts ................. H04H 60/46 |
| | | 725/9 |
| 2014/0149487 A1 * | 5/2014 | Dikmen ................ H04L 63/306 |
| | | 709/203 |
| 2014/0229964 A1 * | 8/2014 | Waisanen ......... H04N 21/44222 |
| | | 725/14 |
| 2014/0280603 A1 * | 9/2014 | Rideout ................. H04W 4/21 |
| | | 709/205 |
| 2017/0187770 A1 | 6/2017 | Debashish |
| 2017/0257410 A1 | 9/2017 | Galen |

* cited by examiner

SYSTEMS AND METHODS FOR AUTOMATICALLY RETURNING TO PLAYBACK OF A MEDIA ASSET WHEN THE MEDIA ASSET IS TRENDING IN SOCIAL CHATTER

BACKGROUND

Media assets, especially live broadcast programs such as sporting events, are not always of interest to a user at all times during the broadcast. A user may tune to other assets during commercial breaks, half-time shows, or other times when the asset is not of particular interest to the user. Often, when a user tunes to a different, second asset, the user becomes engrossed in the second asset and may forget to return to the first asset in a timely manner, or at all. As a result, the user may miss a portion of the first asset, including important events therein, such as the user's favorite football team scoring a touchdown. Related art systems may automatically return to a media asset when a commercial break ends, but do not detect events in the first asset, or use such detected events to trigger a return operation.

SUMMARY

Systems and methods are disclosed herein for automatically returning to a first media asset that was replaced by playback of a second media asset when the first media asset is trending in social chatter. A social network associated with a user is monitored for chatter related to the first media asset. If a threshold amount of chatter is detected, a return operation is triggered.

As an example, while watching a first media asset, such as a football game, a media guidance application may receive user input to tune to a different, second media asset during, for example, a commercial break in the first media asset. The media guidance application may begin monitoring a social network for chatter (e.g., posts, messages, status updates, etc.) relating to the first media asset, such as a name of one of the football teams playing in the game comprising the first media asset. If the media guidance application detects a threshold amount of chatter, the media guidance application may identify a time in the football game corresponding to the chatter, and automatically replace playback of the second media asset with playback of the first media asset (i.e., the football game) at the identified time.

In some aspects, a media guidance application may identify the first media asset. For example, the media guidance application may access program listings data relating to the first media asset. In some embodiments, the media guidance application may store identifying information relating to the first media asset, such as the program title, or, in the case of a sporting event, the names of at least one team involved in the sporting event.

The media guidance application may receive a command from a user input device to access and play back a second media asset. For example, a channel-up or channel-down command may be received. In response to the command, the media guidance application may replace playback of the first media asset with playback of the second media asset.

The media guidance application may monitor activity of the social network associated with the user for any chatter related to the first media asset. For example, the media guidance application may monitor messages, posts, and status updates for any mention of the first media asset or any stored identifying information relating to the first media asset. The media guidance application may determine the amount of chatter related to the first media asset. For example, the media guidance application may count the number of items of chatter (e.g., messages, posts, and status updates) related to the first media asset. The media guidance application may compare the amount of chatter to a threshold value to reduce the likelihood of prematurely returning to the first media asset. For example, if the amount of chatter detected does not meet the threshold, the media guidance application will not return to the first media asset. If the amount of chatter detected meets or exceeds the threshold, the media guidance application may return to the first media asset.

The media guidance application may return to the first media asset at a play position corresponding to the detected chatter. The media guidance application may begin recording the first media asset at the time the user tunes to the second media asset. Alternatively or additionally, the media guidance application may record the time at which the user tunes to the second media asset in a format recognized by a cloud-based recording platform associated with the user equipment. The media guidance application may transmit the time to the cloud-based recording platform to initiate recording of the first media asset from that time. This allows the user to see the event he/she missed while tuned to the second media asset. For example, an event occurs in the first media asset while the user is watching the second media asset. The media guidance application determines, based on the amount of chatter exceeding a threshold amount, that the event occurred. The media guidance application may return to the first media asset at a play position corresponding to the time at which the amount of chatter exceeded the threshold amount.

In some embodiments, the media guidance application may measure the amount of chatter by periodically accessing the social network, and determining the amount of chatter within a given time period. For example, the media guidance application may count the number of posts and status updates published in the last five minutes relating to the first media asset. The media guidance application may determine the amount of chatter as an integer number of items of chatter, for example, fifty items, or as a percentage of the total chatter analyzed, for example, twenty-five percent.

In some embodiments, the media guidance application determines whether the amount of chatter that relates to the first media asset exceeds the threshold amount by determining a first amount of chatter that relates to the first media asset within a first time period and a second amount of chatter that relates to the first media asset within a second time period. For example, after a first five-minute time period, the media guidance application may determine and record a first amount of published chatter that relates to the first media asset. After a second five-minute time period, the media guidance application may determine and record a second amount of published chatter that relates to the first media asset. The media guidance application may compare the first amount of chatter and the second amount of chatter to determine the relative change in the amount of chatter that relates to the first media asset. The media guidance application may retrieve a threshold value from storage, representing an amount of chatter, and may determine if the relative change in the amount of chatter exceeds the threshold value. For example, the media guidance application detects twenty-five published posts relating to the first media asset during a first time period, and one hundred fifty published posts during a second time period. The media guidance application determines a relative change of one hundred twenty-five published posts. The retrieved threshold value may be one hundred. The media guidance application may therefore determine that the relative change exceeds the threshold value.

In some embodiments, the first time period corresponds to the time at which playback of the second media asset replaced playback of the first media asset (i.e., the time at which the user tuned to the second media asset). The media guidance application may determine the amount of chatter that relates to the first media asset published at or around the time of tuning to the second media asset. The media guidance application may compare subsequent detections of chatter with the amount of chatter detected at the time of tuning to the second media asset. For example, the media guidance application may detect an amount of chatter that relates to the first media asset several minutes after the time of tuning to the second media asset and compare it with the amount of chatter detected at the time of tuning to the second media asset to determine a relative change.

In some embodiments, in response to determining that the amount of chatter exceeds the threshold value, the media guidance application may generate a message simultaneously with playback of the second media asset informing the user about a trending event associated with the first media asset. For example, the media guidance application may generate for display a message overlaid on the second media asset. The media guidance application may replace playback of the second media asset with playback of the first media asset in response to a user selection of an option included in the message. In some embodiments, the media guidance application may automatically replace playback of the second media asset with playback of the first media asset after a specified amount of time, such as five seconds. The media guidance application may accept user input to override the automatic replacement of media assets.

In some embodiments, the media guidance application may generate for display a notification informing the user that an event occurred on the first media asset, and the user may manually choose to return to the first media asset.

In some embodiments, the media guidance application sets the playback position of the first media asset to a time corresponding to the earliest time stamp of the chatter that relates to the first media asset. For example, the media guidance application detects, after a first time period, that the amount of chatter that relates to the first media asset exceeds the threshold amount. The media guidance application may process the time stamp of each item of the chatter published during the first time period, and may select the earliest time stamp of the chatter. For example, while the period of time considered by the media guidance application comprises a five-minute period, the chatter began during the second minute of the period. The media guidance application may set the playback position of the first media asset to a time corresponding to the second minute of the five-minute period.

In some embodiments, in monitoring the social media activity, the media guidance application may establish a baseline amount of chatter that relates to the first media asset. For example, at the time the user tunes to the second media asset, and the media guidance application begins monitoring the social media activity, there may already be users publishing posts and status updates relating to the first media asset. The media guidance application may record the amount of chatter at this time as a baseline amount of chatter that relates to the first media asset. Subsequent determinations of whether the amount of chatter exceeds the threshold amount may take this baseline level into account. For example, the media guidance application may use the baseline amount to establish a relative change in the amount of chatter that relates to the first media asset, and compare the relative change to the threshold amount.

In some embodiments, the media guidance application resides on a user device such as a set-top box. The first media asset may be a sports game. Chatter relating to the first media asset may be chatter containing references to a sports team featured in the sports game. For example, the first media asset may be a football game between the New York Giants and the Philadelphia Eagles. Chatter received at the set-top box may be analyzed by the media guidance application for references to either the Giants or the Eagles. Because there may be other meanings for the words "giants" and "eagles", the media guidance application may use other content from the chatter to determine if the chatter relates to the first media asset. For example, chatter relating to "giants" that also includes references to New York or to football terms such as "touchdown" or "first down" may be determined to relate to the first media asset. Conversely, chatter relating to "giants" that also includes references to fantasy novels or nature, such as forests or mountains, may be determined not to relate to the first media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
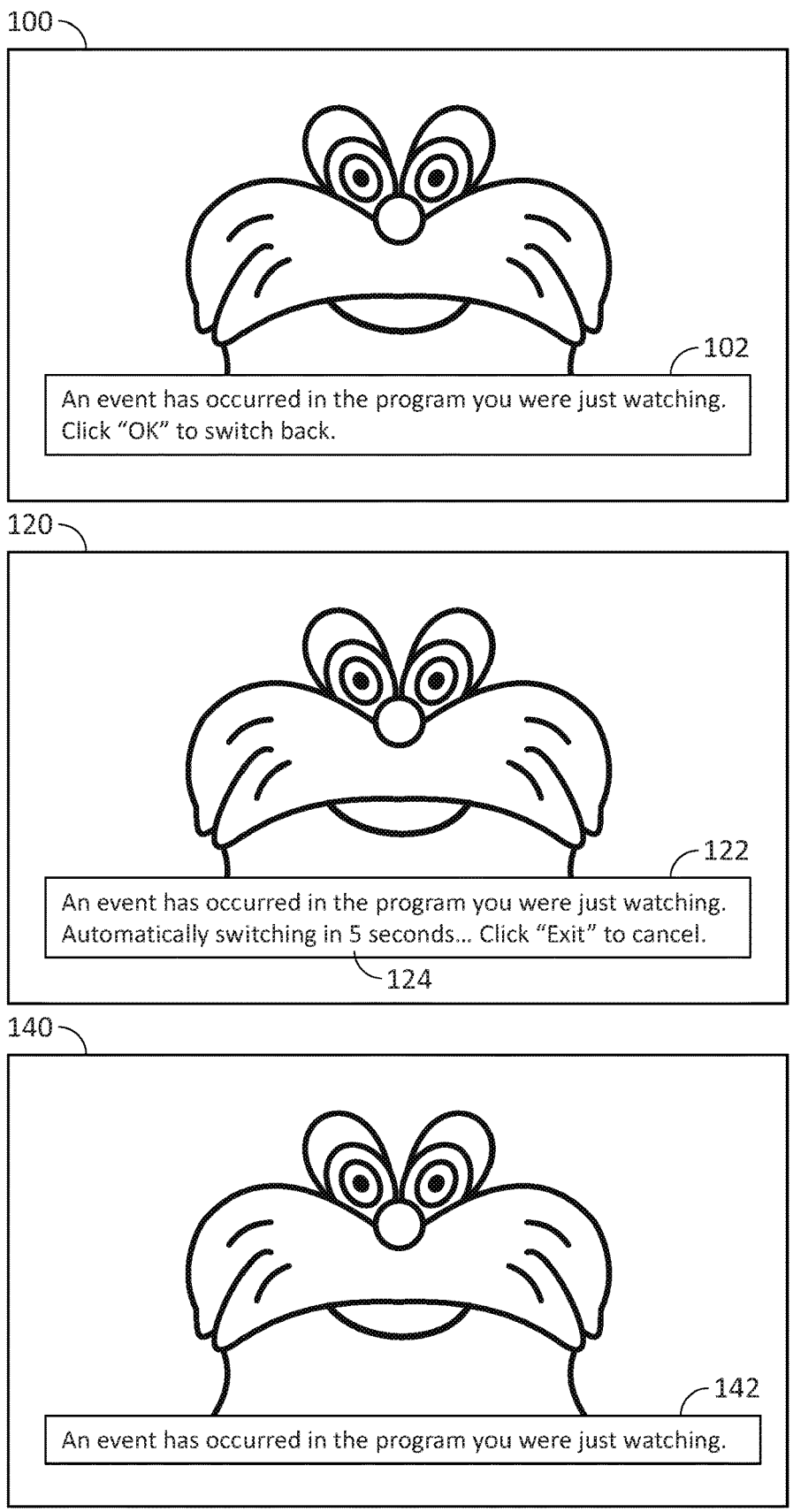
FIG. 1 shows several illustrative display screens including a message indicating a social media trending event in accordance with some embodiments of the disclosure.

FIG. 1 shows exemplary display screens including a message generated by a media guidance application according to some embodiments of the disclosure. While viewing a first media asset, a user may choose to watch a second media asset, for example during a commercial break in the first media asset. Display screens 100, 120, and 140 each display the second media asset, as well as messages 102, 122, and 142 overlaid on each of display screens 100, 120, and 140, respectively. The media guidance application may identify the first media asset by, for example, accessing program listings data relating to the first media asset. The media guidance application may extract relevant information from the program listings data, such as the title of the program, or, in the case of a sporting event, the names and home locations of each team. In some embodiments, the media guidance application may store the extracted information relating to the first media asset in a storage medium.

The media guidance application may be configured to connect to a network, such as the Internet. The media guidance application may reside on a multimedia device (e.g., a set-top box). The device may include a network connection such as an Ethernet port or an IEEE 802.11a, b, g, and/or n ("WiFi") module. The media guidance application may connect to a social network associated with the user. The term social network, as used herein, is defined to mean a platform on which users share personal content with other users (e.g., by peer-to-peer messaging and/or publication to some or all viewers on a platform). Examples of platforms include platforms where users may friend or follow one another (e.g., Facebook, Twitter, Instagram), or platforms where users may chat (e.g., text messaging, e-mail, SMS messaging, instant messaging, and the like). Social network users may connect with each other, allowing the connected users access to each other's personal content. The media guidance application may include a web browser through which a user may log in to a social network. The media guidance application may store the user's credentials in a storage medium and use the credentials to access the social network when needed. The media guidance application may remain logged in to the social media network indefinitely, such as through the use of cookies. The media guidance application may remain logged in until a user manually logs out of the social network. In some embodiments, the media guidance application may access a profile associated with the user in which the user has entered social network credentials.

The media guidance application may monitor activity of the social network associated with the user for any chatter related to the identified first media asset. As referred to herein, chatter is defined to mean any or all of text messages, SMS messages, e-mails, instant messages, public messages, private messages, group messages, posts, and status updates published on the monitored social network. As an example, the media guidance application may crawl the social network associated with the user. The media guidance application may limit its crawling to parts of the social network to which the user has access. For example, a user may have access to his/her friends' pages on the social network, any content thereon, and any messages, posts, or status updates published by them. Access to other parts of the social network may be limited or denied. The media guidance application may review and index messages, posts, and status updates for any mention of the identified first media asset or any stored identifying information relating to the first media asset. Alternatively, the media guidance application may communicate with a remote server, such as by using a Hyper Text Transfer Protocol ("HTTP") request, and request that the remote server perform the crawling operations. The remote server may respond, such as by using an HTTP response, with the indexed social media data. It is noted that, while HTTP is the protocol mentioned here, other protocols may be used.

The media guidance application may receive chatter from the social network in real time. For example, the media guidance application may be configured to receive push notifications from the social network, or may be subscribed to a Rich Site Summary ("RSS") feed from the social network. The RSS feed may provide real time, or near-real time updates relating to the chatter published on the social network. The media guidance application may process the chatter received in real time and determine an amount of chatter that relates to the first media asset. The media guidance application may, for example, count a number of items of chatter relating to the first media asset received via push notification over a period of time, or may count the number of items of chatter relating to the first media asset included in each update received via the RSS feed.

The media guidance application may determine the amount of chatter related to the first media asset. The media guidance application may initialize a counter variable. For each detected message, post, or status update relating to the first media asset, the media guidance application may increment the counter variable by one. The media guidance application may compare the value of the counter variable to a threshold value. This comparison reduces the likelihood of prematurely returning to the first media asset. Only if the amount of chatter detected meets or exceeds the threshold will the media guidance application return to the first media asset.

The media guidance application may limit the detection of chatter to items published on the social network within a discrete period of time. The media guidance application may use a time-based filter to retrieve only items of chatter published within the discrete time period. For example, the media guidance application may limit the detected chatter to items published within the last thirty minutes. As another example, the media guidance application may access program guide data to identify a starting time of the first media asset. The media guidance application may then limit the detected chatter to items published at or after the start time of the first media asset.

The media guidance application may, alternatively or additionally, limit the detection of chatter to items published within a threshold amount of time. For example, to determine if chatter related to the first media asset is trending, the media guidance application may determine the temporal proximity of each item of chatter. If the items of chatter fall temporally close together, and are published within a threshold amount of time, such as two minutes, the media guidance application may determine that the first media asset is trending. The threshold amount of time may be an absolute period of time (i.e., any two-minute period within a period of detection) or may be relative to the current time (i.e., the two-minute period ending at the current time).

When the media guidance application determines that the amount of chatter exceeds the threshold amount, the media guidance application may generate for display message 102, informing the user that an event has occurred in the first media asset. The message 102 may also include an instruction to press a particular button, such as an "OK" button, on a user input device to return to the first media asset. The media guidance application may detect the press of a button, such as an "OK" button, on the user input device. For example, the user input device may be a remote control, smartphone, tablet, or other user input device, and the user equipment on which the media guidance application resides may include a receiver module configured to receive signals from the remote control. The user input device may transmit signals via infrared, WiFi, Bluetooth®, or any other suitable signaling protocol. Upon receipt of the signal, the media guidance application may process the signal and determine what button was pressed. In response to determining that the "OK" button was pressed, the media guidance application may return to the first media asset. In response to an "Exit" or "Cancel" button being pressed, the media guidance application may discontinue generating for display message 102, and not return to the first media asset.

The media guidance application may alternatively generate message 122 for display, informing the user of the event in the first media asset, and further informing the user that playback of the first media asset will replace playback of the second media asset automatically in a given amount of time. The time indicator 124 may be static, or the media guidance application may update the indicator 124 to correspond to the actual time remaining before playback of the first media asset occurs. The media guidance application may detect the press of a button on a user input device, as described above. In response to determining that the "OK" button was pressed, the media guidance application may return to the first media asset prior to the expiration of the time remaining. In response to determining that the "Exit" or "Cancel" button was pressed, the media guidance application may discontinue generating for display message 122, and not return to the first media asset.

As another alternative, the media guidance application may generate message 142, informing the user of the event in the first media asset, but requiring the user to manually return to the first media asset. This alternative may be used in cases where the second media asset is determined to be of equal interest to the user. For example, the media guidance application may access a profile associated with the user which may include user preferences and interests and determine an interest level for the first media asset and the second media asset. If the interest levels are the same, or similar, the media guidance application may generate for display a message such as message 142. In order to return to the first media asset, the user may press a "Last" button or similar control on the user input device, in response to which the media guidance application is configured to return to the last-tuned media asset. Alternatively, message 142 may include an identification of the channel or service on which the first media asset is being broadcast. Using the user input device, a user may enter the channel number or, if available, press a dedicated button for the service on which the first media asset is being broadcast. In response, the media guidance application may tune to the channel or service on which the first media asset is being broadcast.

Any of messages 102, 122, and 142 may also include a description of the event which occurred in the first media asset. The description may be acquired from a remote service, such as a sportscasting service, or may be generated based on the content of the chatter. For example, if the chatter includes the word "touchdown", the media guidance application may generate a description informing the user that a team scored a touchdown. If the chatter also includes the name of the team, or an icon, glyph, or image identifying the team, the media guidance application may include the team name in the description of the event.

The media guidance application may return to the first media asset at a play position corresponding to the detected chatter by accessing a recorded version of the first media asset. The media guidance application may record the first media asset beginning at the time the user tunes to the second media asset, or may transmit the time to a cloud-based recording platform and initiate recording of the first media asset at the cloud-based recording platform at that time. Alternatively or additionally, the media guidance application may buffer a portion of the first media asset. For example, the media guidance application may buffer up to thirty minutes of the first media asset while the second media asset is being played back. If the media guidance application is tuned to the second media asset for longer than thirty minutes, the media guidance application will delete the oldest portion of the buffered first media asset in favor of the most recent portion. For example, the media guidance application may fill the buffer with up to thirty minutes of content corresponding to the first media asset. If the buffer reaches its capacity of the thirty minutes of content, data corresponding to the content is shifted out of the buffer and deleted, beginning with the oldest data, thereby allowing the data corresponding to the current portion of the first media asset to be added to the buffer. The play position of the first media asset may be set to the time at which the amount of chatter exceeded the threshold value. This allows the user to see the event he/she missed while tuned to the second media asset. For example, at 7:35 pm the user tunes to the second media asset. At 7:42 pm an event occurs in the first media asset. Chatter from other users of the social network begins at nearly the same time. At 7:45 pm, the media guidance application determines that the amount of chatter exceeds a threshold amount. The media guidance application may return to the first media asset at a play position corresponding to 7:45 pm. Alternatively, as will be discussed below, the media guidance application may return to the first media asset at a play position corresponding to the earliest time stamp of the chatter.

In some embodiments, the media guidance application may measure the amount of chatter by periodically accessing the social network, and determining the amount of chatter within a given time period. For example, the media guidance application may count the number of posts and status updates published in the last five minutes. The media guidance application may compute as the amount of chatter the number of published post and status updates in the given time period that relate to the first media asset. For example, hundreds of posts and status updates may be published in a five-minute period, but only seventy-five of them relate to the first media asset. Thus, the amount of chatter is computed as seventy-five.

In some embodiments, the media guidance application determines whether the amount of chatter that relates to the first media asset exceeds the threshold amount by determining a first amount of chatter that relates to the first media asset within a first time period and a second amount of chatter that relates to the first media asset within a second time period. For example, at 7:40 pm, the media guidance application may determine the amount of chatter that relates to the first media asset that was published between 7:35 pm and 7:40 pm. At 7:45 pm, the media guidance application may determine the amount of chatter that relates to the first media asset that was published between 7:40 pm and 7:45 pm. The media guidance application may compare the first amount of chatter and the second amount of chatter to determine the relative change in the amount of chatter that relates to the first media asset. The media guidance application may retrieve a threshold value from storage, representing an amount of chatter, and determine if the relative change in the amount of chatter exceeds the threshold value. For example, the media guidance application detects twenty-five published posts relating to the first media asset between 7:35 pm and 7:40 pm, and one hundred fifty published posts between 7:40 pm and 7:45 pm. The media guidance application determines a relative change of one hundred twenty-five published posts. The retrieved threshold value may be one hundred. The media guidance application may therefore determine that the relative change exceeds the threshold value.

In some embodiments, the first time period corresponds to the time at which playback of the second media asset replaced playback of the first media asset (i.e., the time at which the user tuned to the second media asset). For example, the user tunes to the second media asset at 7:35 pm. The media guidance application may determine the amount of chatter that relates to the first media asset published at or around 7:35 pm. The media guidance application may compare subsequent detections of chatter with the amount of chatter detected at 7:35 pm. For example, at 7:55 pm the media guidance application may detect an amount of chatter that relates to the first media asset and compare it with the amount of chatter detected at 7:35 pm to determine a relative change.

In some embodiments, in response to determining that the amount of chatter exceeds the threshold value, the media guidance application generates a message simultaneously with playback of the second media asset informing the user about a trending event associated with the first media asset. The media guidance application may generate for display a message (e.g., message 102, 122, or 142) overlaid on the second media asset. Alternatively, the message may be transmitted for display on a second device such as a mobile device associated with the user. The message may, alternatively or additionally, include an audio component, such as a beep, tone, musical phrase, or other audio element. The media guidance application may replace playback of the second media asset with playback of the first media asset in response to a user selection of an option included in the message. For example, the message may include a selectable region or icon, or an instruction to press a particular button on a user input device, as shown in exemplary display screen 100. In the case of an audio message, the media guidance application may be configured to accept certain signals from the user input device, for a period of time (e.g., five seconds) following the message, as a command to return to the first media asset or to cancel a return operation. In some embodiments, the media guidance application may automatically replace playback of the second media asset with playback of the first media asset after a specified amount of time, such as five seconds. The media guidance application may accept user input to override the automatic replacement of media assets, as shown in exemplary display screen 120. In some embodiments, the media guidance application may generate for display a simple message informing the user that an event occurred on the first media asset, as shown in exemplary display screen 140, and the user may manually choose to return to the first media asset.

In some embodiments, the media guidance application sets the playback position of the first media asset to a time corresponding to the earliest time stamp of the chatter that relates to the first media asset. The media guidance application may detect that the amount of chatter that relates to the first media asset exceeds the threshold amount at 7:45 pm. The media guidance application may process the time stamp of each item of the chatter. Although the media guidance application detected that the amount of chatter exceeded the threshold amount at 7:45 pm, the period of time considered by the media guidance application comprises a five-minute period from 7:40 pm to 7:45 pm. The media guidance application may select the earliest time stamp of the chatter. For example, while the period of time considered by the media guidance application runs from 7:40 pm to 7:45 pm, the chatter began at 7:42 pm. The media guidance application may set the playback position of the first media asset to a time corresponding to 7:42 pm. The media guidance application may access the recorded version of the first media asset at the set playback position, or may transmit the set playback position to the cloud-based recording platform.

In some embodiments, in monitoring the social media activity, the media guidance application may establish a baseline amount of chatter that relates to the first media asset. For example, at the time the user tunes to the second media asset, and the media guidance application begins monitoring the social network activity, there may already be an amount of chatter relating to the first media asset. The media guidance application may record the amount of chatter at this time as a baseline amount of chatter that relates to the first media asset. The media guidance application may use the baseline amount as a measurement of the user's interest level in the first media asset. For example, if the baseline amount of chatter is one hundred, the media guidance application may determine that the user is only mildly interested in the first media asset, whereas a baseline amount of twenty may indicate a high interest in the first media asset. In other words, the more chatter relating to the first media asset detected at the time the user tunes to the second media asset, the less interested the user may be. Subsequent determinations of whether the amount of chatter exceeds the threshold amount may take this baseline level into account. For example, the media guidance application may use the baseline amount to establish a relative change in the amount of chatter that relates to the first media asset, and compare the relative change to the threshold amount. For example, if one hundred items of chatter relating to the first media asset are detected as the baseline amount, and a subsequent detection returns one hundred and twenty items of chatter, the media guidance application may determine a relative change of twenty. If the threshold amount is greater than twenty, the media guidance application may not return to the first media asset, even though a total of one hundred and twenty items of chatter were detected.

In some embodiments, the media guidance application may reside on user equipment, such as those described below with reference to FIG. 5 (i.e., user television equipment 502, user computer equipment 504, and/or wireless user communications device 506), or display 100, 120 and/or 140. For example, the media guidance application may reside on a set-top box. Alternatively or additionally, the media guidance application may reside on a display device such as a TV, smart TV, personal computer, tablet, or smartphone.

In some embodiments, the first media asset is a sports game, such as a football game. To determine if the chatter relates to the football game, the content of each item of chatter, including any text, icons, glyphs, and images, may be searched, indexed, analyzed, or otherwise processed to determine if either team playing in the football game is referred to. For example, the football game may be between the New York Giants and the Philadelphia Eagles. The media guidance application may search each item of chatter for any mention of the words "giants" or "eagles", as well as any mentions of "New York" or "Philadelphia". The media guidance application may also access a database of known words, acronyms, abbreviations, images, logos, and the like relating to each team, and to each city. The database may be stored locally, such as in storage 408, or on a remote server such as media guidance data source 518. For example, the database may contain an entry relating to the Giants such as the abbreviation "NYG". The database may also contain entries relating to New York such as "The Big Apple", "NYC", and "NY". The database may also contain image files relating to each team, such as team logos and mascots. The database may also contain glyphs such as specialized emoji icons relating to each team.

The media guidance application may use contextual clues from the content of each item of chatter to ensure that references to the first media asset are correctly identified. For example, an item of chatter may contain the word "giants", but may be related to a fantasy novel or naturalist theory about a larger-than-normal species of humanoids. Thus, the media guidance application may search for words, icons, glyphs, or images relating specifically to football to ensure that the item of chatter relates to the first media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, program-based recommendations, related programs, similar programs, and any other type of guidance data that is helpful for a user to navigate among and locate desired content selections.

Figure 2:
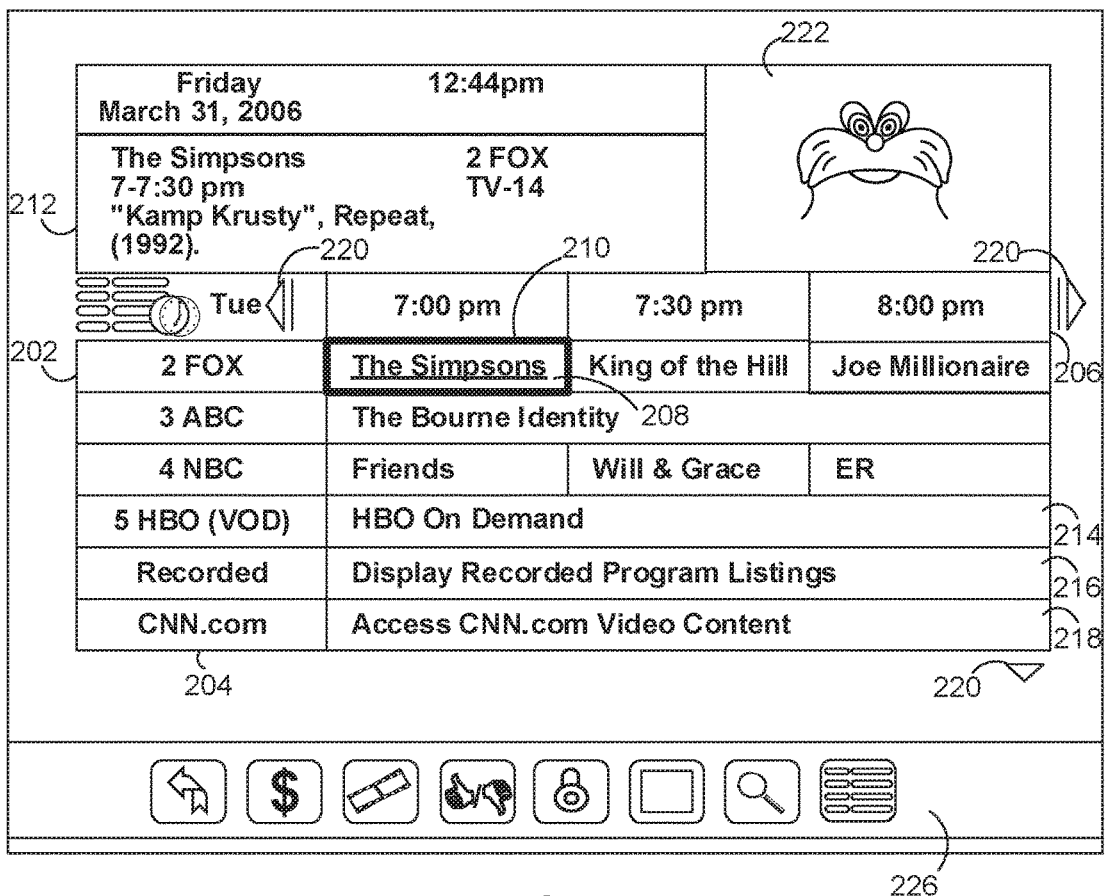
FIG. 2 shows an illustrative display screen that may be used to provide media guidance data in accordance with some embodiments of the disclosure.
Figure 3:
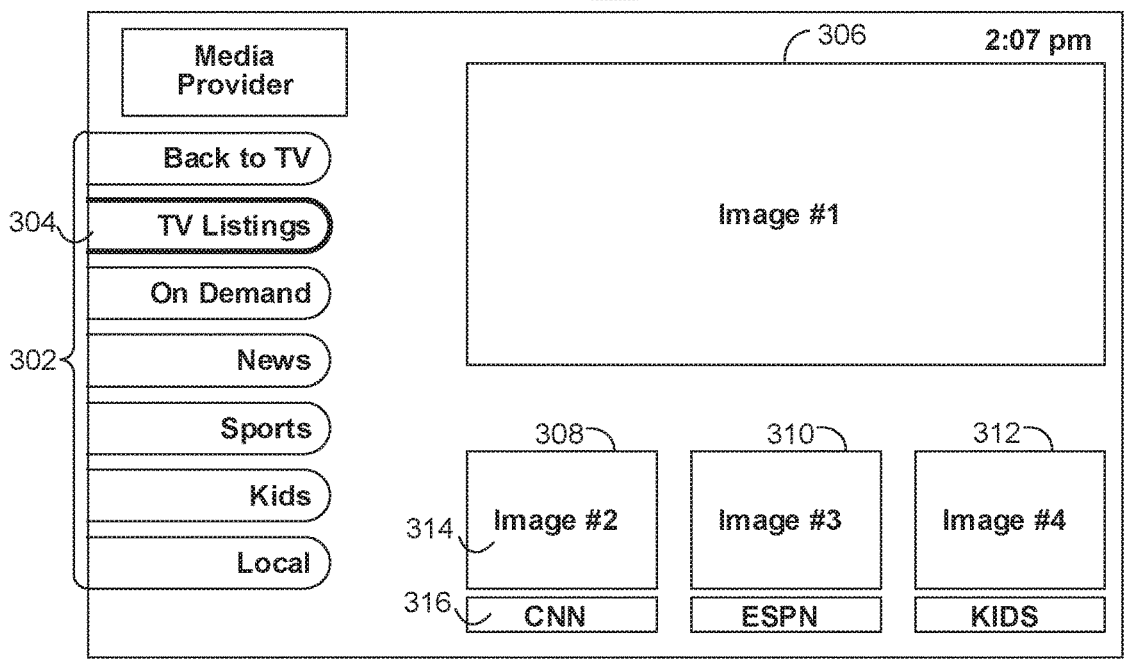
FIG. 3 shows an illustrative display screen that may be used to provide media guidance data in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows an illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
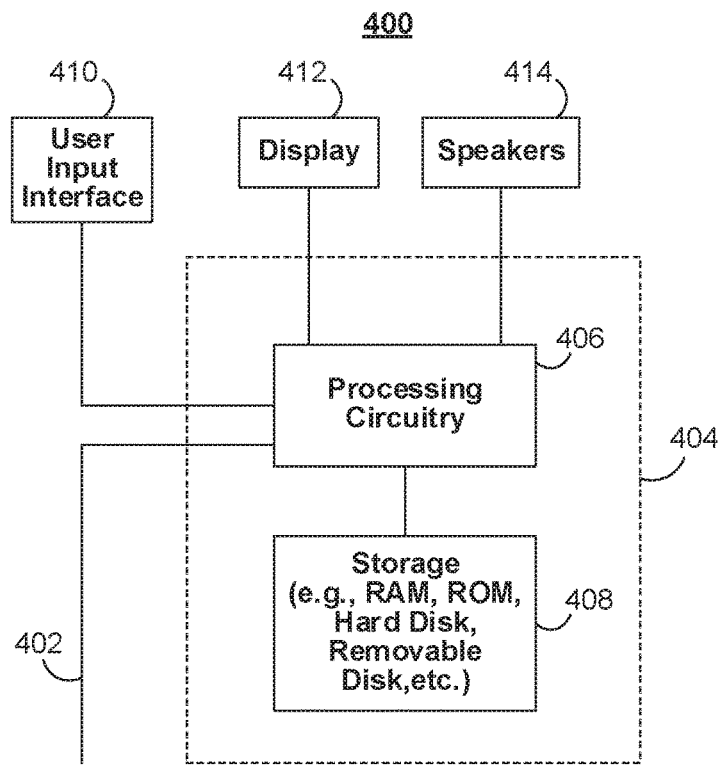
FIG. 4 shows a generalized embodiment of a stand-alone device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
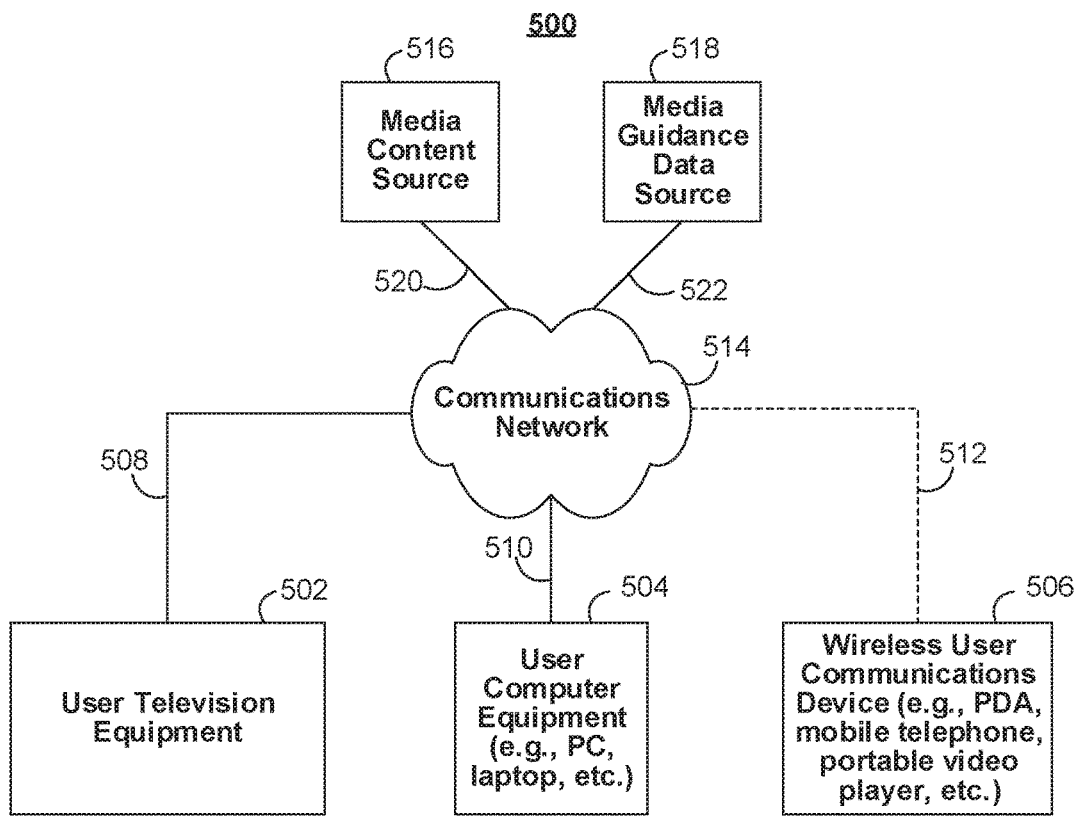
FIG. 5 shows a specific implementation of user devices in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications networks or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, other users of a social network with whom the user interacts, what types of social network interactions are performed by the user, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
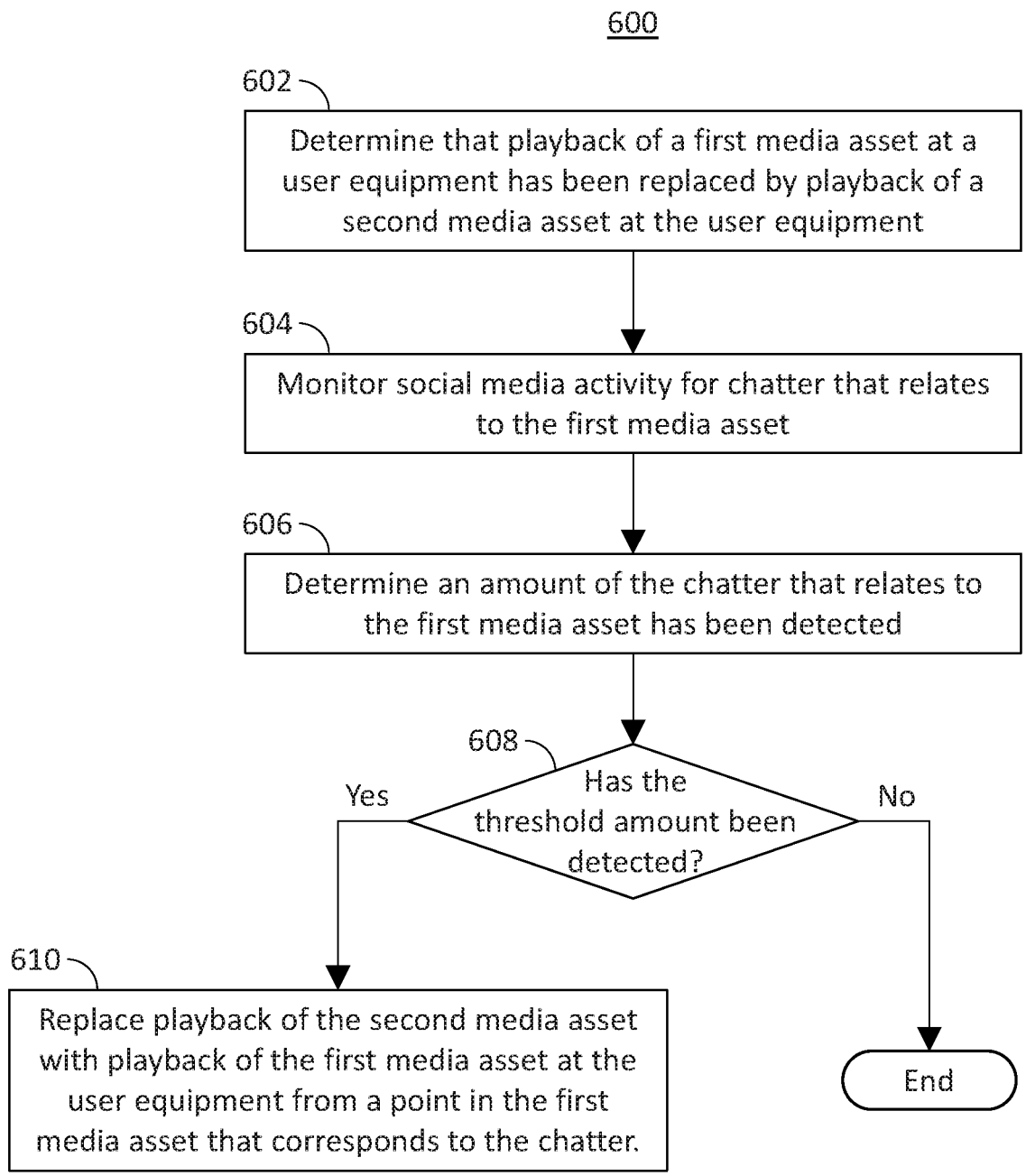
FIG. 6 is a flowchart representing an illustrative process for returning to a media asset based on trending social media data in accordance with some embodiments of the disclosure.

FIG. 6 is a flowchart representing an illustrative process for returning to a media asset based on trending social media data in accordance with some embodiments of the disclosure. The flowchart in FIG. 6 represents a process 600 implemented on control circuitry 404 for returning to a media asset based on trending social media data according to an embodiment of the disclosure. It should be noted that process 600 or any action thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5), as well as display screens 100, 120, and/or 140 (FIG. 1)) in order to return to a media asset based on trending social media data. In addition, one or more actions of process 600 may be incorporated into or combined with one or more actions of any other process or embodiment described herein.

While watching a first media asset, a user may choose to watch a second media asset. For example, control circuitry 404 may be generating for display on display 412, such as display screen 100, a first media asset comprising a football game. Control circuitry 404 may receive, via user input interface 410, a command or signal from a user input device to change the channel. At 602, control circuitry 404 may determine that playback of the first media asset (i.e., the football game) has been replaced by playback of a second media asset. For example, control circuitry 404 may store identifying information of the first media asset in storage 408, such as the channel number and/or the channel name on which the football game is broadcast, the teams involved in the football game, or any other identifying information. Control circuitry 404 may periodically access media guide data, for example, from media guidance data source 518 via communications network 514, and retrieve identifying information of the media asset being played back, and compare the identifying information with the stored identifying information located in storage 408. If the identifying information of the current media asset being played back does not match the stored identifying information, control circuitry 404 may determine that playback of a second media asset has replaced playback of the first media asset. Alternatively, control circuitry 404 may receive, at user input interface 410, a command from a user input device to tune to another media asset. After processing the command and successfully tuning to the second media asset, control circuitry 404 may determine that playback of the first media asset has been replaced by playback of the second media asset.

When control circuitry 404 determines that playback of the first media asset has been replaced by playback of the second media asset, control circuitry 404 may begin recording of the first media asset. Control circuitry 404 may store the recorded media content in local storage (e.g., storage 408), or remote storage, such as media guidance data source 518. Control circuitry 404 may, alternatively or additionally, record in a data structure in, for example, storage 408, the time that playback of the second media asset began. The time may be recorded in a format recognized by a cloud-based recording platform associated with the user equipment. Control circuitry 404 may transmit, via communications network 514, the time to the cloud-based recording platform, thereby initializing a cloud-based recording of the first media asset beginning at the recorded time. Alternatively, control circuitry 404 may, via communications network 514, transmit the recorded time, as well as an authentication code or other authorization indicating the user equipment is permitted to access cloud-based recordings. In response, the cloud-based recording platform may store the recorded time and an authorization for the user equipment to access the first media asset beginning from a point corresponding to the recorded time.

At 604, control circuitry 404 may monitor social media activity for chatter that relates to the first media asset. Control circuitry 404 may access a social network associated with the user, via communications network 514. Control circuitry 404 may store (e.g., in storage 408) user credentials for the social network associated with the user. Control circuitry 404 may receive, at user input interface 410, credentials entered by a user using a user input device. Alternatively, control circuitry 404 may access a user profile associated with the user in which the user may enter credentials for the social network. The user profile may be stored locally (e.g., in storage 408), or on a remote server (e.g., media guidance data source 518).

Control circuitry 404 may request or receive data from the social network, for example via communications network 514. Control circuitry 404 may communicate with the social network using HTTP requests, or any other suitable Internet communication protocol. For example, control circuitry 404 may send an HTTP GET request to the social network, requesting all chatter accessible to the user that was published in the last five minutes. Alternatively, control circuitry 404 may request only a portion of the chatter accessible to the user published in the last five minutes. For example, certain other users to which the user is connected on the social network may express, in a public profile, interest in football, or in a specific team involved in the football game comprising the first media asset. Control circuitry 404 may filter the request for published chatter to chatter from only those users who are likely to publish chatter relating to the football game. Control circuitry 404 may receive a response from the social network via, for example, communications network 514, containing the requested chatter.

At 606, control circuitry 404 may determine an amount of chatter that relates to the first media asset has been detected. Control circuitry 404 may parse each received item of the chatter and compare the content to the stored identifying information. Control circuitry 404 may count the number of items of the chatter containing content that matched the stored identifying information, and store the number in a variable held in, for example, storage 408.

At 608, control circuitry 404 may determine if the detected amount of chatter relating to the first media asset exceeds a threshold amount. The threshold amount may be retrieved from a variable or data structure located in storage 308. Control circuitry 404 may determine a threshold amount as a percentage of the total chatter detected, or as a specific number of items of chatter. Control circuitry 404 may compare the detected amount of chatter relating to the first media asset with the threshold amount.

At 610, if the detected amount of chatter relating to the first media asset exceeds the threshold amount, control circuitry 404 may automatically replace playback of the second media asset at, for example, display screen 100, with playback of the first media asset. The playback position of the first media asset may be set in accordance with the recorded time at which playback of the first media asset was replaced by playback of the second media asset. Control circuitry 404 may access the locally-stored version of the media content corresponding to the first media asset from storage 408, or the remotely-stored version of the media content corresponding to the first media asset from the cloud-based recording platform via communications network 514 and begin playing back the stored content from a point corresponding to the time the amount of chatter exceeded the threshold amount. Alternatively, control circuitry 404 may transmit a request to the cloud-based recording platform to playback the first media asset from the time the amount of chatter exceeded the threshold amount.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 6.

Figure 7:
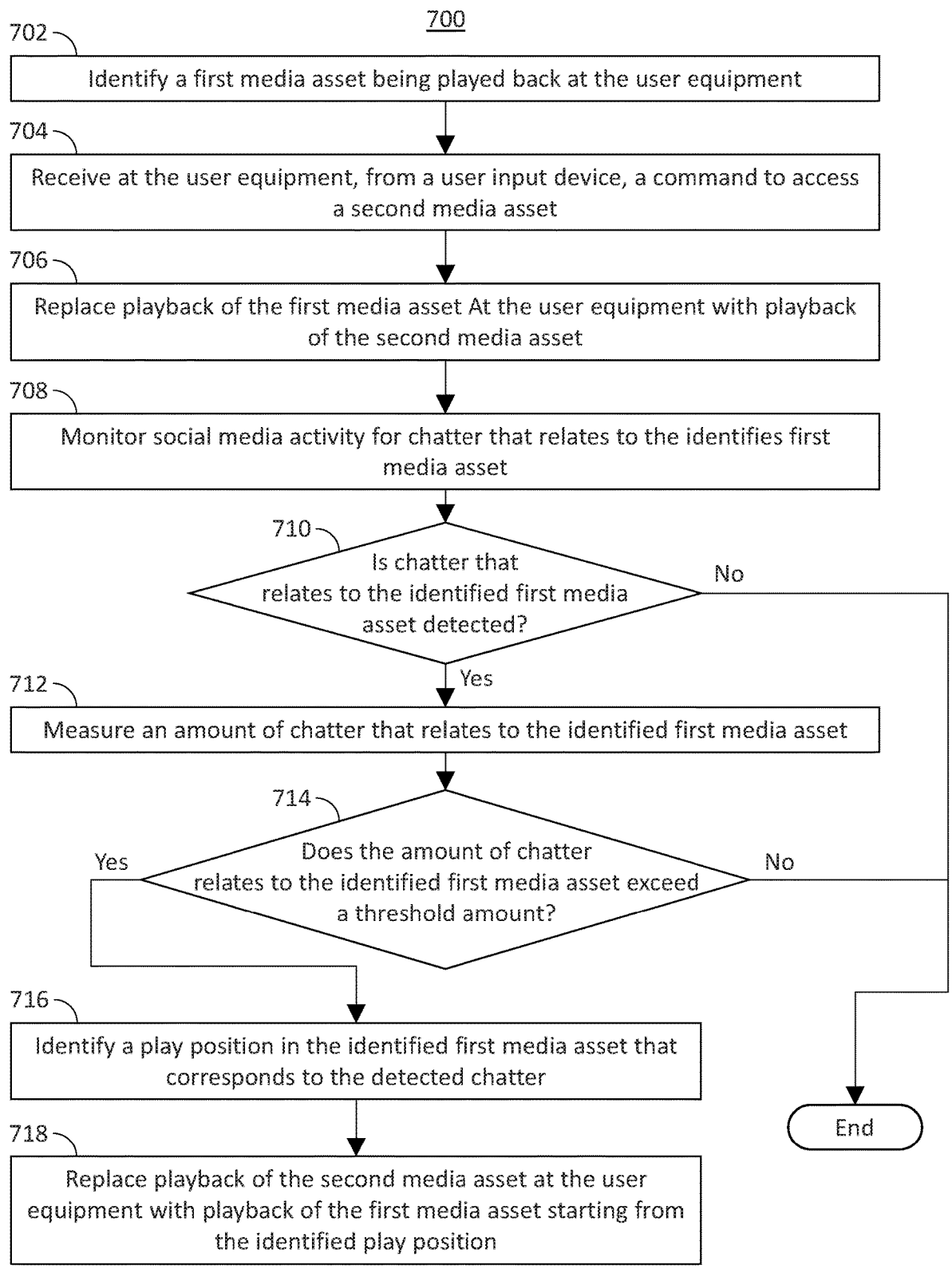
FIG. 7 is a flowchart representing an illustrative process for returning to a media asset based on trending social media data in accordance with some embodiments of the disclosure.

FIG. 7 is a flowchart representing an illustrative process for returning to a media asset based on trending social media data in accordance with some embodiments of the disclosure. The flowchart in FIG. 7 represents a process 700 implemented on control circuitry 404 for returning to a media asset based on trending social media data according to an embodiment of the disclosure. It should be noted that process 700 or any action thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5), as well as display screens 100, 120, and/or 140 (FIG. 1)) in order to return to a media asset based on trending social media data. In addition, one or more actions of process 700 may be incorporated into or combined with one or more actions of any other process or embodiment described herein.

At 702, control circuitry 404 may identify a first media asset being played back at a user equipment, such as user equipment 502, 504, and/or 506, or display screen 100, 120, and/or 140. Control circuitry 404 may identify the first media asset, for example, by accessing program listings data related to the first media asset stored locally in storage 408, or remotely, via communications network 514, in media guidance data source 518, and extract any or all data fields, including program title, channel, air time, description, or a unique program identifier such as a database index number. As another example, control circuitry 404 may record the channel number, or RF frequency on which the first media asset is broadcast in a variable or data structure stored in, for example, storage 408. If the first media asset is received at user equipment (e.g., user equipment 502, 504, 506, or display screen 100, 120, 140) as part of a larger data stream, such as an MEPG-2 transport stream, control circuitry 404 may record the program identifier ("PID") of the particular portion of the stream at which the first media asset can be found. Control circuitry 404 may store the identifying information in a variable or data structure in a storage medium, such as storage 408.

At 704, control circuitry 404 may receive from a user input device, for example via user input interface 410, a command to access a second media asset. The command may be a channel-up or channel-down command, a direct tune command (e.g., a command to tune to a specific channel number), a "jump" command (i.e., a command to tune to the channel to which the user equipment was tuned prior to the current channel), or a command to tune to a specific program, such as selection of a result of a search query, or selection of a program from grid 202, such as program listing 208.

At 706, control circuitry 404 may replace playback of the first media asset at the user equipment (such as user equipment 502, 504, 506, or display screen 100, 120, 140) with playback of the second media asset. This may be accomplished in several ways. For example, control circuitry 404 may tune an RF receiver to a frequency associated with the second media asset. As another example, control circuitry 404 may access a stream or plurality of data packets within a transport stream such as an MPEG-2 transport stream. Such access may be based on a program identifier ("PID"), the location of which within the transport stream may be determined from metadata of the transport stream.

When control circuitry 404 determines that playback of the first media asset at the user equipment has been replaced by playback of the second media asset, control circuitry 404 may begin recording of the first media asset. Control circuitry 404 may store the recorded media content in local storage (e.g., storage 408), or remote storage, such as media guidance data source 518. Control circuitry 404 may, alternatively or additionally, record the time that playback of the second media asset began in a variable or data structure in, for example, storage 408. The time may be recorded in a format recognized by a cloud-based recording platform associated with the user equipment. Control circuitry 404 may transmit, via communications network 514, the time to the cloud-based recording platform, thereby initializing a cloud-based recording of the first media asset beginning at the recorded time. Alternatively, control circuitry 404 may transmit, via communications network 514, the recorded time, as well as an authentication code or other authorization indicating the user equipment is permitted to access cloud-based recordings. In response, the cloud-based recording platform may store the recorded time and an authorization for the user equipment to access the first media asset beginning from a point corresponding to the recorded time.

At 708, control circuitry 404 may monitor social media activity for chatter that relates to the first media asset. Control circuitry 404 may access a social network associated with the user, for example, via communications network 514. Control circuitry 404 may request login credentials from the user by generating for display a login dialog box. Control circuitry 404 may receive the user's login credentials, entered using a user input device, via user input interface 410. Control circuitry 404 may store (e.g., in storage 408) the user's login credentials for future use. Control circuitry 404 may request from the social network, via communications network 514, all published items of chatter which the user is authorized to view (e.g., items of chatter published by members of the social network to whom the user is directly connected may be accessible, while items published by members to whom the user is not connected may be blocked). Control circuitry 404 may limit the request for items of chatter to items that were published during the broadcast of the first media asset. For example, if broadcast of the first media asset began at 7:00, control circuitry 404 may request only those items of chatter published after 7:00. Control circuitry may request the chatter using an HTTP GET request via communications network 514. Control circuitry may receive the chatter from the social network via the communications network 514 in the form of an HTTP response. Alternatively, the social network may include an application programming interface ("API"), through which control circuitry 404 may request the chatter via communications network 514. As another alternative, control circuitry 404 may crawl the social network (i.e., systematically browse all portions of the social network which the user is authorized to see) via communications network 514, and record the chatter. Control circuitry 404 may analyze each item of chatter to determine if it relates to the first media asset. Control circuitry 404 may retrieve identifying information of the first media asset from storage (e.g., storage 408), or from a program listings database such as media guidance data source 518, and search the content of each item of chatter for words matching the identifying information. For example, the identifying information may include the name of a football team. Control circuitry 404 may search each item of chatter for the name of the football team, and detect any positive matches.

If a positive match is detected (i.e., at least one item of chatter contains at least some of the identifying information of the first media asset) then, at 712, control circuitry 404 may measure the amount of chatter that relates to the first media asset. Control circuitry 404 may count the number of items of the chatter containing content that matched the stored identifying information, and store the number in a variable or data structure held in, for example, storage 408. Methods for measuring the amount of chatter will be described more fully below in relation to FIG. 8.

At 714, control circuitry 404 may determine if the amount of chatter that relates to the first media asset exceeds a threshold amount. Control circuitry 404 may store in a variable or data structure (e.g., in storage 408) a threshold value against which to compare the measured amount of chatter relating to the first media asset. Alternatively, control circuitry 404 may determine a threshold amount as a percentage of the total chatter detected. For example, the total amount of chatter retrieved from the social network may vary. A static threshold value may be too low, too high, or may exceed the number of items of chatter retrieved. Control circuitry 404 may instead set the threshold value as a percentage of the total number of chatter items retrieved from the social network, such as twenty-five percent. Control circuitry 404 may set the threshold value as a percentage increase in chatter relating to the first media asset. For example, there may be a sustained low level of chatter relating to the first media asset at all times during the broadcast thereof. A static threshold level, or a simple percentage may both result in false positives. Control circuitry 404 may therefore set the threshold value at an amount equal to a percentage increase (e.g., twenty-five percent) in chatter relating to the first media asset. Control circuitry 404 may compare the detected amount of chatter relating to the first media asset with the threshold amount.

If the amount of chatter relating to the first media asset exceeds the threshold value then, at 716, control circuitry 404 may identify a play position in the first media asset that corresponds to the detected chatter. For example, control circuitry 404 may access a time stamp of the chatter and identify a play position of the first media asset that corresponds to the time stamp. Control circuitry may access a locally-stored recording of the first media asset, for example, in storage 408, and access a time stamp or time code contained in the locally-stored recording of the first media asset. Control circuitry 404 may, alternatively or additionally, transmit, via communications network 514, the time stamp of the chatter to the cloud-based recording platform. Alternatively, control circuitry 404 may identify a play position of the first media asset corresponding to a fixed amount of time (e.g., two minutes) before the amount of chatter was detected to exceed the threshold amount.

At 718, control circuitry 404 may replace playback of the second media asset at the user equipment (such as user equipment 502, 504, 506, or display screen 100, 120, 140) with playback of the first media asset from the identified play position. The playback position of the first media asset may be set in accordance with the recorded time at which playback of the first media asset was replaced by playback of the second media asset. Control circuitry 404 may access the locally- or remotely-stored version of the media content corresponding to the first media asset and begin playing back the stored content from a point corresponding to the time the amount of chatter exceeded the threshold amount. Alternatively, control circuitry 404 may transmit a request to the cloud-based recording platform to playback the first media asset from the time the amount of chatter exceeded the threshold amount.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 7.

Figure 8:
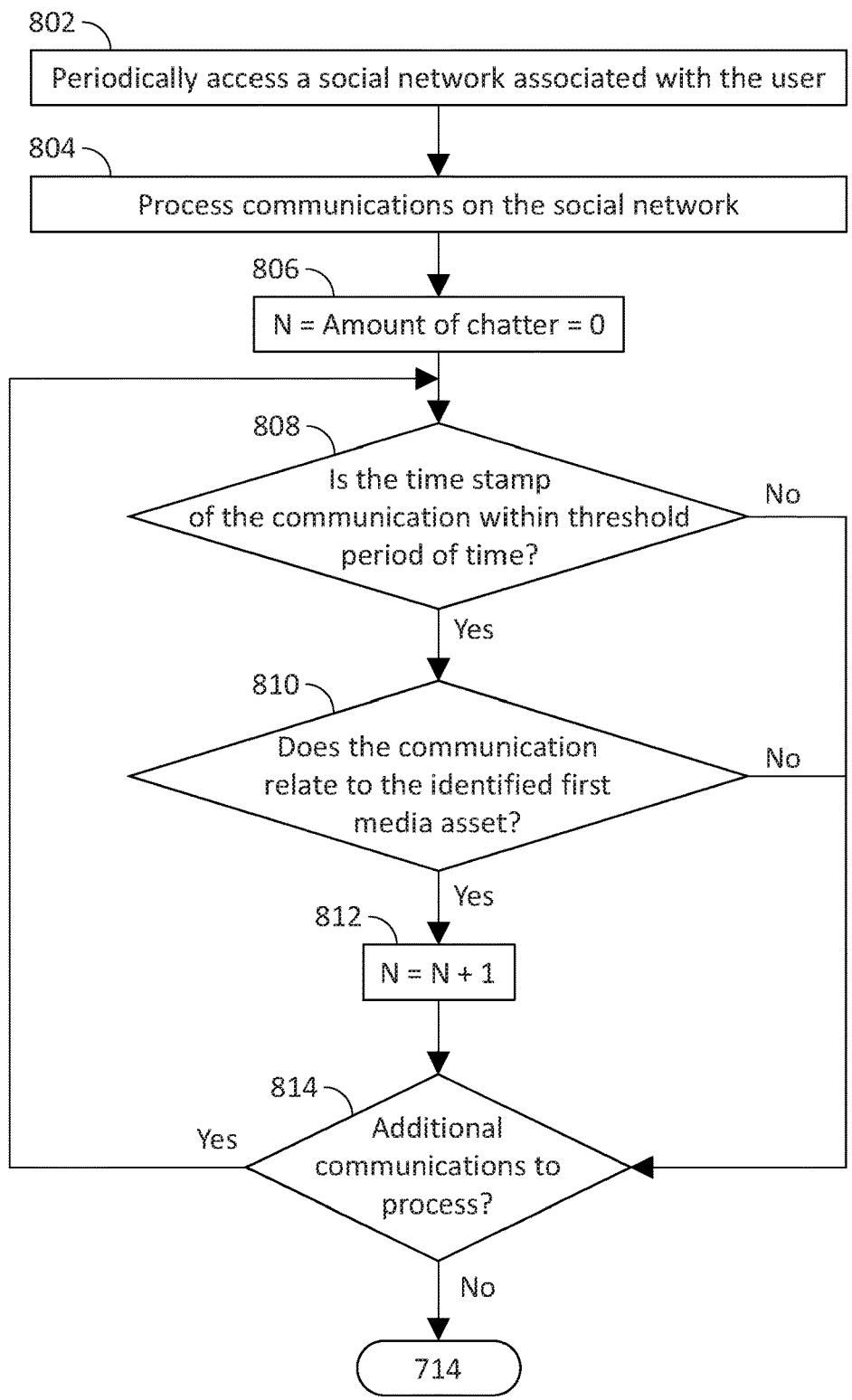
FIG. 8 is a flowchart representing an illustrative process for measuring an amount of social media activity in accordance with some embodiments of the disclosure.

FIG. 8 is a flowchart representing an illustrative process for measuring an amount of social media activity in accordance with some embodiments of the disclosure. The flowchart in FIG. 8 represents a process 800 implemented on control circuitry 404 for measuring an amount of social media activity according to an embodiment of the disclosure. It should be noted that process 800 or any action thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5), as well as display screens 100, 120, and/or 140 (FIG. 1)) in order to measure an amount of social media activity. In addition, one or more actions of process 800 may be incorporated into or combined with one or more actions of any other process or embodiment described herein.

At 802, control circuitry 404 may periodically access, via communications network 514, the social network associated with the user. For example, control circuitry 404 may access the social network every five minutes. Control circuitry 404 may request all published chatter each time, or may request only the chatter published since the last time a request was made (i.e., all chatter published in the preceding five minutes).

At 804, control circuitry 404 may process the chatter retrieved from the social network. Processing may include searching for content in each item of chatter matching at least some of the identifying information of the first media asset. Processing may include evaluating a time stamp of each item of chatter. At 806, control circuitry 404 may initialize a counter variable with an initial value of zero. Control circuitry 404 may store the counter variable in, for example, storage 408.

At 808, control circuitry 404 may evaluate the time stamp of a first item of chatter. In order to determine if an item of chatter relating to the first media asset is new, control circuitry 404 may calculate whether the time stamp falls within a particular time period. For example, control circuitry 404 may calculate the difference between the time of the most recent request for chatter, and the time represented by the time stamp. If the difference is within a certain number of minutes (e.g., five minutes), control circuitry 404 may evaluate the content of the item of chatter. If the difference is greater than the certain number of minutes, control circuitry 404 will evaluate the time stamp of the next item of chatter.

At 810, control circuitry 404 may determine if the item of chatter relates to the first media asset. Control circuitry 404 may compare the textual content of the item of chatter with the stored identifying information of the first media asset. For example, the identifying information may contain the name of a football team. Control circuitry 404 may search the textual content of the item of chatter for the name of the team. Control circuitry 404 may augment the identifying information by accessing a database of images associated with each piece of identifying information. The database may be stored locally (e.g., in storage 408) or on a remote server (e.g., media guidance data source 518) accessible via communications network 514. Control circuitry 404 may then, using an image recognition module, compare any images or glyphs contained in the item of chatter with images retrieved from the database matching the identifying information.

At 812, if the item of chatter is detected to relate to the first media asset, control circuitry 404 increments the counter variable by one. At 814, control circuitry 404 determines if there are additional items of chatter to process. If there are additional items, control circuitry 404 may return to action 808 to process the next item. If there are no additional items, control circuitry 404 may proceed to determine if the amount of chatter exceeds a threshold amount, as described above in relation to action 714 of FIG. 7.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 8.

Figure 9:
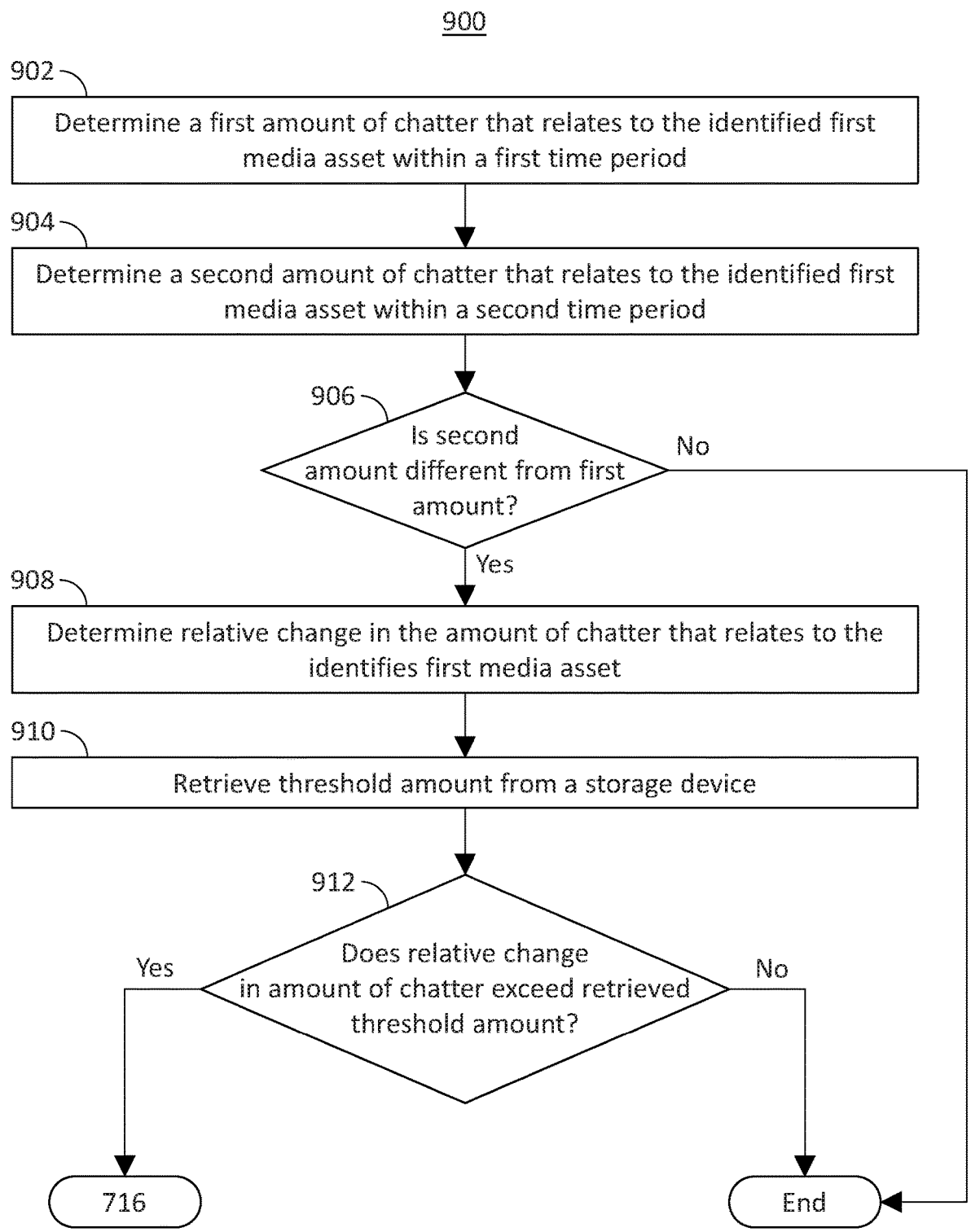
FIG. 9 is a flowchart representing an illustrative process for determining if the amount of social media activity exceeds a threshold in accordance with some embodiment of the disclosure.

FIG. 9 is a flowchart representing an illustrative process for determining if the amount of social media activity exceeds a threshold in accordance with some embodiment of the disclosure. The flowchart in FIG. 9 represents a process 900 implemented on control circuitry 404 for determining if the amount of social media activity exceeds a threshold according to an embodiment of the disclosure. It should be noted that process 900 or any action thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506 (FIG. 5), as well as display screens 100, 120, and/or 140 (FIG. 1)) in order to determine if the amount of social media activity exceeds a threshold. In addition, one or more actions of process 900 may be incorporated into or combined with one or more actions of any other process or embodiment described herein.

At 902, control circuitry 404 may determine a first amount of chatter that relates to the first media asset within a first time period. For example, control circuitry 404 may request, via communications network 514, chatter from the social network for a given time period. Control circuitry 404 may determine the amount of chatter that relates to the first media asset over the given time period as described above in relation to FIG. 8. Alternatively, control circuitry 404 may request, via communications network 514, chatter from the social network for a given time period and determine the amount of chatter that relates to the first media asset for a first portion of the given time period. For example, control circuitry 404 may request chatter for a five-minute period, but measure the amount of chatter in each 2-and-a-half-minute period separately. This approach may enhance the temporal resolution of the detection of chatter relating to the first media asset.

At 904, control circuitry 404 may determine a second amount of chatter that relates to the first media asset within a second time period. Control circuitry 404 may make a second request, via communications network 514, for chatter from the social network, or, as described above, may split chatter received from the social network in response to a single request based on time periods shorter than the total time period of the request.

At 906, control circuitry 404 may compare the first amount of chatter and the second amount of chatter. At 908, if the amount of chatter has changed, control circuitry 404 may determine the relative change between the first and second amounts of chatter. Control circuitry 404 may subtract an integer representing the first amount of chatter from an integer representing the second amount of chatter. This results in a positive integer if the amount of chatter has increased, and a negative integer if the amount of chatter has decreased.

At 910, control circuitry 404 may retrieve a threshold amount from storage (e.g., storage 408). As described above, the threshold value may be static, or may by calculated by control circuitry 404. Additionally, the threshold may represent a total amount of chatter, or an amount of chatter relative to previous detections. At 912, control circuitry 404 determines if the relative change in the amount of chatter exceeds the threshold amount. If the relative change does exceed the threshold amount, control circuitry 404 may proceed to identify a play position in the first media asset that corresponds to the chatter, as described above with relation to action 716 of FIG. 7.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 9.

Figure 10:
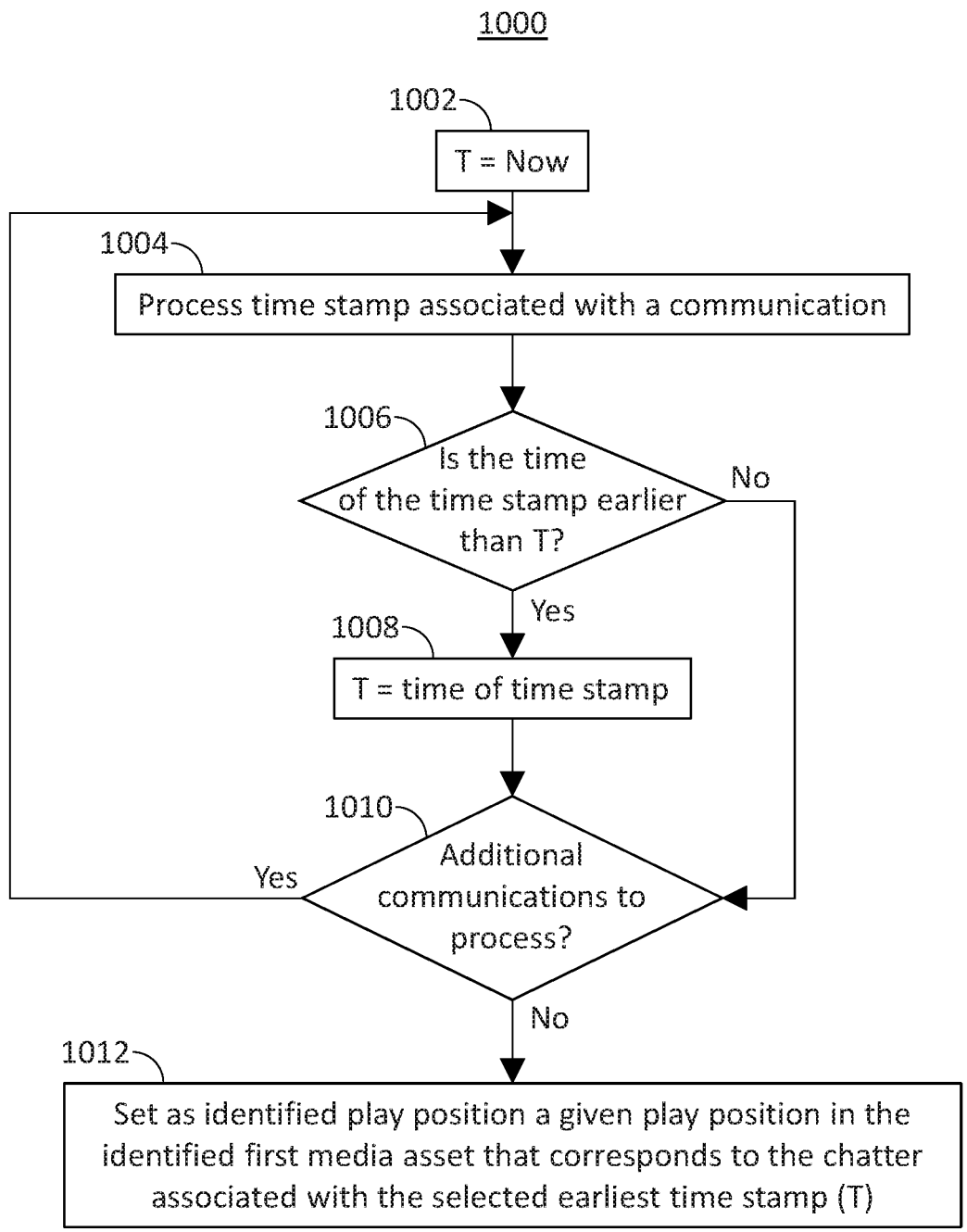
FIG. 10 is a flowchart representing an illustrative process for setting a play position of a media asset in accordance with some embodiments of the disclosure.

FIG. 10 is a flowchart representing an illustrative process for setting a play position of a media asset in accordance with some embodiments of the disclosure. The flowchart in FIG. 10 represents a process 1000 implemented on control circuitry 404 for setting a play position of a media asset according to an embodiment of the disclosure. It should be noted that process 1000 or any action thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5), as well as display screens 100, 120, and/or 140 (FIG. 1)) in order to set a play position of a media asset. In addition, one or more actions of process 1000 may be incorporated into or combined with one or more actions of any other process or embodiment described herein.

At 1002, control circuitry 404 may initialize a time stamp variable T in storage 408, and set the initial value of T to the current time. At 1004, control circuitry 404 may process a time stamp associated with an item of chatter relating to the first media asset. For example, each item of chatter may include, in its content, or in metadata associated with the item, a time stamp representing the time at which the item was published on the social network. Some items of chatter may be published by social network users in different time zones. The time stamp may include a time zone, a Greenwich Mean Time ("GMT") time and/or offset, or Universal Time Code ("UTC") time and/or offset, which may be used by control circuitry 404 to determine the local time corresponding to the time stamp.

At 1006, control circuitry 404 may compare the processed time stamp of the item of chatter to the value of time stamp variable. If the time stamp is earlier than the value of the time stamp variable, control circuitry 404 may, at 1008, update the value of the time stamp variable to reflect the time stamp of the item of chatter. At 1010, control circuitry may determine if there are additional items of chatter to process. If there are additional items, control circuitry 404 may move to the next item and return to action 1004 to process the time stamp of the next item.

At 1012, after the time stamps of all items of chatter relating to the first media asset have been processed, control circuitry 404 may set the play position of the first media asset to a play position corresponding to the earliest time stamp (i.e., the time represented by the time stamp variable) of the chatter relating to the first media asset. Control circuitry 404 may adjust the play position to be earlier than the earliest time stamp to account for some delay between the event in the first media asset which caused social network users to begin publishing chatter relating thereto, and the time at which the first item of chatter is actually published.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 10.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically returning to a first media asset that was replaced by playback of a second media asset when the first media asset is trending in social chatter, the method comprising:

identifying a first media asset being played back at user equipment;

receiving at the user equipment, from a user input device, a command to access a second media asset;

in response to the command to access the second media asset, replacing playback of the first media asset at the user equipment with playback of the second media asset;

monitoring social media activity for chatter that relates to the identified first media asset; and in response to detecting, during the monitoring, chatter that relates to the identified first media asset:

measuring an amount of chatter that relates to the identified first media asset;

determining a first amount of chatter that relates to the identified first media asset within a first time period;

determining a second amount of chatter that relates to the identified first media asset within a second time period;

comparing the first amount with the second amount to determine a relative change in the amount of chatter that relates to the identified first media asset;

retrieving a threshold amount of change from a storage device;

determining whether the relative change in the amount of chatter exceeds the retrieved threshold amount of change;

in response to determining that the relative change in the amount of chatter exceeds the retrieved threshold amount of change, determining that the amount of chatter that relates to the identified first media asset exceeds a threshold amount of chatter; and in response to determining that the amount of chatter that relates to the identified first media asset exceeds the threshold amount of chatter:

identifying a play position in the identified first media asset that corresponds to the detected chatter; and replacing playback of the second media asset at the user equipment with playback of the first media asset starting from the identified play position.

2. The method of claim 1, wherein the chatter comprises at least one of public messages, private messages, group messages, posts, and status updates.

3. The method of claim 1, wherein measuring the amount of chatter comprises:
   periodically accessing a social network associated with the user;
   processing communications on the social network associated with time stamps that are within a threshold period of time to identify communications related to the identified first media asset; and
   computing as the amount of chatter how many communications are identified, during the processing, that relate to the identified first media asset.

4. The method of claim 1, wherein the first time period corresponds to the time at which the playback of the first media asset at the user equipment was replaced with the playback of the second media asset.

5. The method of claim 1, further comprising:
   in response to determining that the amount of chatter that relates to the identified first media asset exceeds the threshold amount, generating a message simultaneously with playback of the second media asset informing the user about a trending event associated with the first media asset, wherein the playback of the second media asset is replaced with playback of the first media asset responsive to receiving a user selection of an option included in the message.

6. The method of claim 1, further comprising:
   processing time stamps associated with the chatter;
   selecting an earliest time stamp associated with the chatter; and
   setting as the identified play position a given play position in the identified first media asset that corresponds to the chatter associated with the selected earliest time stamp.

7. The method of claim 1, wherein monitoring social media activity for chatter that relates to the identified first media asset comprises establishing a baseline amount of chatter that relates to the identified first media asset.

8. The method of claim 1, further comprising generating for display a notification that the threshold amount of chatter that relates to the identified first media asset has been detected.

9. The method of claim 1, wherein:
   the user equipment comprises a set-top box;
   the first media asset comprises a sports game; and
   the chatter that relates to the identified first media asset comprises status updates relating to the name of a sports team featured in the sports game.

10. A system for automatically returning to a first media asset that was replaced by playback of a second media asset when the first media asset is trending in social chatter, the system comprising:
   user input circuitry; and
   control circuitry configured to:
      identify a first media asset being played back at user equipment;
      receive at the user equipment, using the user input circuitry, a command to access a second media asset;
      in response to the command to access the second media asset, replace playback of the first media asset at the user equipment with playback of the second media asset;
      monitor social media activity for chatter that relates to the identified first media asset; and
      in response to detecting, during the monitoring, chatter that relates to the identified first media asset:
         measure an amount of chatter that relates to the identified first media asset;
         determine a first amount of chatter that relates to the identified first media asset within a first time period;
         determine a second amount of chatter that relates to the identified first media asset within a second time period;
         compare the first amount with the second amount to determine a relative change in the amount of chatter that relates to the identified first media asset retrieve a threshold amount of change from a storage device;
         determine if the relative change in the amount of chatter exceeds the retrieved threshold amount of change;
         in response to determining that the relative change in the amount of chatter exceeds the retrieved threshold amount of change, determine that the amount of chatter that relates to the identified first media asset exceeds a threshold amount of chatter; and
         in response to determining that the amount of chatter that relates to the identified first media asset exceeds the threshold amount of chatter:
            identify a play position in the identified first media asset that corresponds to the detected chatter; and
            replace playback of the second media asset at the user equipment with playback of the first media asset starting from the identified play position.

11. The system of claim 10, wherein the chatter comprises at least one of public messages, private messages, group messages, posts, and status updates.

12. The system of claim 10, wherein the control circuitry is further configured, when measuring the amount of chatter, to:
   periodically access a social network associated with the user;
   process communications on the social network associated with time stamps that are within a threshold period of time to identify communications related to the identified first media asset; and
   compute as the amount of chatter how many communications are identified, during the processing, that relate to the identified first media asset.

13. The system of claim 10, wherein the first time period corresponds to the time at which the playback of the first media asset at the user equipment was replaced with the playback of the second media asset.

14. The system of claim 10, wherein the control circuitry is further configured to:
   in response to determining that the amount of chatter that relates to the identified first media asset exceeds the threshold amount, generate a message simultaneously with playback of the second media asset informing the user about a trending event associated with the first media asset, wherein the playback of the second media asset is replaced with playback of the first media asset responsive to receiving a user selection of an option included in the message.

15. The system of claim 10, wherein the control circuitry is further configured to:
   process time stamps associated with the chatter;
   select an earliest time stamp associated with the chatter; and
   set as the identified play position a given play position in the identified first media asset that corresponds to the chatter associated with the selected earliest time stamp.

16. The system of claim 10, wherein the control circuitry is further configured, when monitoring social media activity for chatter that relates to the identified first media asset, to establish a baseline amount of chatter that relates to the identified first media asset.

17. The system of claim 10, wherein the control circuitry is further configured to generate for display a notification that the threshold amount of chatter that relates to the identified first media asset has been detected.

18. The system of claim 10, wherein:
- the user equipment comprises a set-top box;
- the first media asset comprises a sports game; and
- the chatter that relates to the identified first media asset comprises status updates relating to the name of a sports team featured in the sports game.

* * * * *